United States Patent Office 2,805,614
Patented Sept. 10, 1957

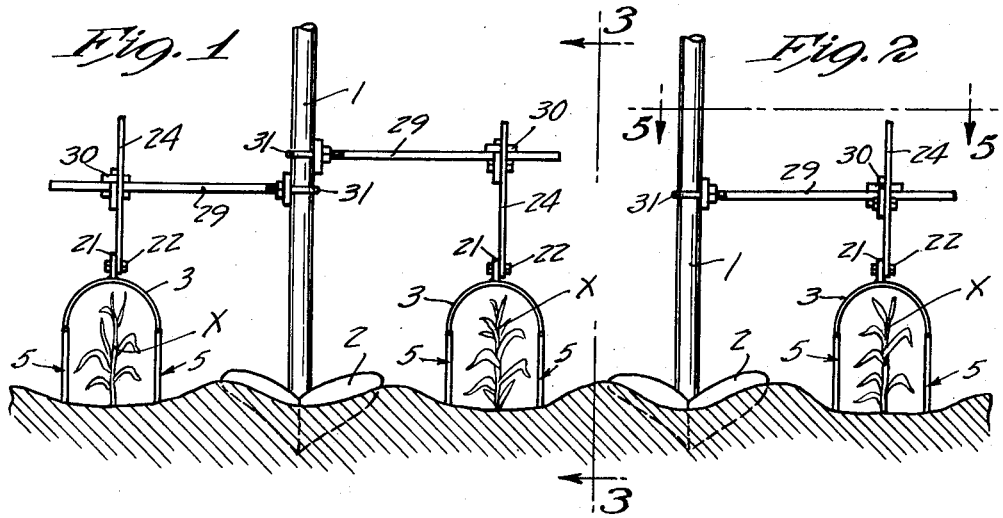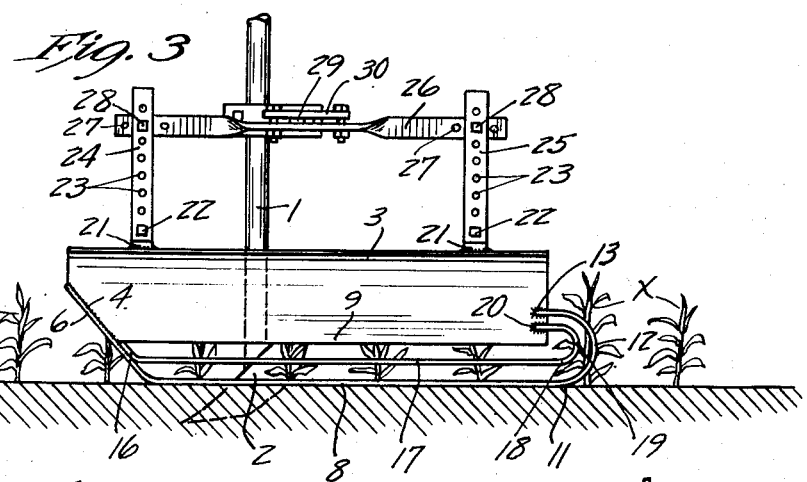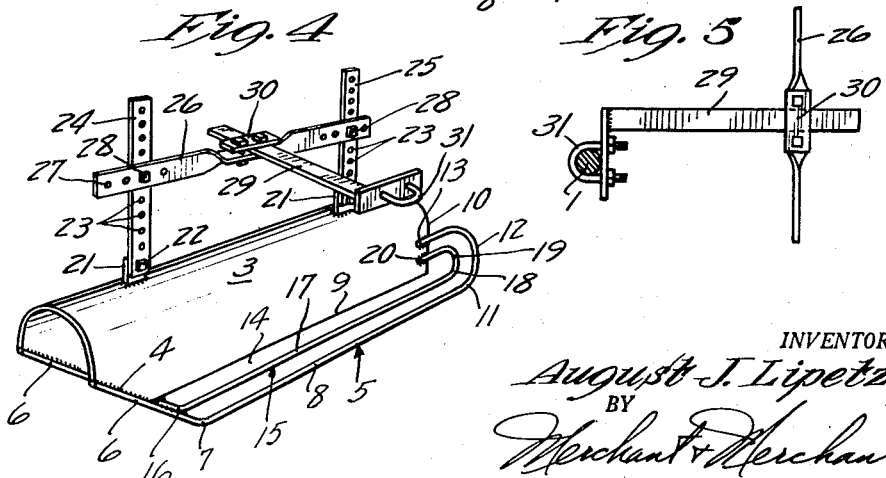
INVENTOR.
August J. Lipetzky
BY
Merchant & Merchant
ATTORNEYS

2,805,614

PLANT PROTECTING ATTACHMENTS FOR CULTIVATORS

August J. Lipetzky, Springfield, Minn.

Application June 11, 1956, Serial No. 590,431

3 Claims. (Cl. 97—188)

My invention relates to attachments for row crop cultivators and more particularly to improvements in plant guards for such cultivators.

In the cultivating of row crops, such as corn and the like, large chunks or clods of topsoil are frequently lifted and overturned by the cultivator teeth, and thus caused to roll upon the small plants being cultivated, frequently breaking the stalks and otherwise damaging same. Numerous elongated plant protecting hoods have heretofore been improvised which are attached to the cultivators and which are dragged along on the ground in a protective relationship to the plants during the cultivating thereof. However, while such hoods must permit entrance thereinto from opposite longitudinal side edges, of relatively small bits of topsoil for the purpose of covering the relatively small weeds immediately adjacent the plant (and also for purposes of breaking up the osmosis process immediately adjacent the plant), it is highly important that such hoods are so constructed as to positively preclude gripping engagement thereof with the leaves of the plants being cultivated, to prevent pulling up the plant or cutting off of said leaves.

No plant protecting hood has heretofore been developed which is completely free from angular surfaces or edges which do engage plant leaves sufficiently to either pull up the plant or cut off said leaf.

The primary object of my invention is the provision of a device of the class above described which not only will freely permit access thereinto from opposite sides, only of topsoil of the desired size, but which also is so completely free from angular surfaces or edges that it is impossible to grasp the leaf of an adjacent plant.

A further object of my invention is the provision of a device of the class immediately above described which is relatively inexpensive to produce, and which is rugged and durable in construction.

The above and still further objects of my invention will become apparent from the following detailed specification, appended claims and attached drawings.

Referring to the drawings, wherein like characters indicate like parts throughout the several views:

Fig. 1 is a view in front elevation of a pair of my novel devices attached to the cultivator knife-carrying leg of a conventional cultivator;

Fig. 2 is a view corresponding to Fig. 1 but showing a single plant guard attached to the cultivator knife-carrying leg of a cultivator;

Fig. 3 is a view in side elevation taken on line 3—3 of Fig. 1;

Fig. 4 is a perspective view of my novel device, and

Fig. 5 is a view partly in transverse section and partly in elevation as seen from the line 5—5 of Fig. 2.

Referring with greater particularity to the drawings, the numeral 1 indicates the leg of a conventional cultivator, to the bottom of which is rigidly secured a cultivating blade or knife 2.

My novel device includes an elongated imperforate hood 3 having an inverted U-shaped cross section, and having open opposite ends for the passage therethrough of row crops X during the cultivating process. Hood 3 may be formed from sheet metal or other suitable material and, preferably and as shown, if formed to provide downwardly and rearwardly extending front edges 4 on opposite sides thereof to facilitate movement over rough terrain with a minimum of friction and also to eliminate any shearing action which a forward edge, at right angles to the ground, might have upon the leaves of plants passing through the hood 3. Runner elements 5 are provided at opposite sides of said hood 3. Preferably and as shown, runner elements 5 are formed from cross sectionally circular metallic rod stock and have their front end portion 6 welded or otherwise rigidly secured to and extending along the opposite downwardly and rearwardly extending edges 4, on opposite sides of the hood 3, and forming downward and rearward extensions thereof to points identified by the numeral 7. The intermediate portions 8 of the runner elements 5 extend rearwardly from points 7, in downwardly spaced parallel relationship to the adjacent bottom longitudinal edges 9 of the hood 3, and terminating rearwardly of the rear edge 10 of said hood 3, as indicated at 11. The rear end portions 12 of the runner elements 5 are generally semi-circular and have their forwardly projected upper end portions secured to the exterior surface of the hood 3, by welding or the like, as indicated by the numeral 13.

Cooperating with the runner elements 5 to provide opposed grills with longitudinally spaced continuous openings 14, are grill forming members 15 which have their front end portions secured one each to a front end portion 6 of one of said runner elements 5, as indicated at 16. The intermediate portions 17 of the grill forming members 15 extend rearwardly in substantially parallel, equidistantly spaced relation to an adjacent longitudinal edge 9 of the hood and to the intermediate portion 8 of a runner element 5, thereby creating longitudinal openings 14 of equal width throughout their length. As shown, the intermediate portions 17 of the grill forming members 15 likewise terminate rearwardly of the rear edge 10 of the hood 3, as indicated at 18. The rear end portions 19 of the grill forming members 15 are also semi-circular in shape and are concentric with the rear semi-circular portions 12 of the runner elements 5. It will be noted that the forwardly projected ends of the read end portions 19 are secured to the outer surface of the hood 3 intermediate an adjacent longitudinal edge 9 and the overlying point of connection 13 of the adjacent portion 12, as indicated at 20.

Projecting upwardly from the crown portion above the hood 3 and rigidly carried thereby are a pair of longitudinally spaced ears 21 which have transverse openings therethrough for the reception of nut-equipped bolts 22 extending loosely therethrough and through the lowermost of a plurality of longitudinally spaced openings 23 in upstanding front and rear links 24 and 25, respectively. A horizontal tie bar 26 is also provided with longitudinally spaced openings 27 adjacent its opposite ends for the reception of nut-equipped bolts 28 which pass loosely through a selected one thereof and a selected one of the vertically spaced openings 23 of the front and rear links 24 and 25 respectively.

A clamping arm 29 is adjustably secureable to the intermediate portion of a tie bar 26 by means of a clamping device 30, preferably and as shown, which permits longitudinal adjustments of the arm 29. At one end the arm 29 is provided with another suitable clamping device 31 permitting vertical adjustments thereof with respect to the arm 1. The links 24 and 25, tie bar 26, and arm 29, may be formed from bar stock, and the adjustments above described make possible the attachment of my novel structure to substantially any type of cultivator produced. Such adjustments also make possible the vertical raising and lowering of the entire hood 3, or either end thereof, to compensate for variations in terrain, size of plants X in the row crop being cultivated, etc.

When my novel structure is used in pairs as shown in Fig. 1, or single as shown in Fig. 2, the soil which is elevated and turned over by means of the cultivating blade 2, is thrown laterally in the direction of hood 3. Obviously the larger chunks or clods will be prevented from impingement with the plants or row crops X, whereas, the finer material will be caused to freely enter through the longitudinally extended uninterrupted openings 14, defined by the bottom longitudinal edges 9, the grill forming members 15 and the runner elements, thus covering the small weeds adjacent the plants X and breaking up the osmosis pattern in the soil. On the other hand, the complete absence of any sharp surface or forwardly facing angular edges totally eliminates cutting off of the leaves of plants X or alternatively the pulling up of such plants X.

My invention has been thoroughly tested and found to be completely satisfactory for the accomplishment of the above objects, and while I have disclosed a preferred embodiment thereof, I wish it to be specifically understood that same is capable of considerable modification without departure from the scope and spirit of the appended claims.

What I claim is:

1. A plant guard for mounting on a power driven cultivator in laterally spaced relation to the soil plowing teeth thereof, said guard comprising an elongated imperforate hood having an inverted U-shaped cross section, the end portion of said hood being formed to provide downwardly and rearwardly extending edges on opposite sides, runner elements for said hood, said runner elements being formed from cross sectionally circular metallic rod stock and having their front end portions secured one each to an opposite side of said hood and forming downward extensions of said downwardly and rearwardly extending edges, the intermediate portions of said runner elements extending rearwardly from the front end portions thereof in downwardly spaced parallel relationship to the bottom longitudinal edges of said hood and terminating rearwardly of said hood, the rear end portions of said runner elements comprising generally semi-circular portions which have their forwardly projected upper ends secured to said hood in vertically spaced relation to a longitudinal edge thereof, and grill forming members, one each of said grill forming members having its front end secured to the front end portion of one of said runners and extending rearwardly therefrom in substantially parallel spaced relation to an adjacent longitudinal edge of said hood and to the intermediate portion of said runer element, the rear end portion of said grill forming members being likewise generally semi-circular rearwardly of said hood and having their forwardly projected upper ends secured to the outer surface of said hood intermediate the adjacent longitudinally extended lower edge and the point of connection of the rear end portion of an adjacent runner element with said hood.

2. A plant guard for mounting on a power driven cultivator in laterally spaced relation to the soil plowing teeth thereof, said guard comprising an elongated imperforate hood having an inverted U-shaped cross section, the front end portion of said hood being formed to provide downwardly and rearwardly extending edges on opposite sides, runner elements for said hood, said runner elements being formed from cross sectionally circular metallic rod stock and having their front end portions secured one each to an opposite side of said hood and forming downward extensions of said downwardly and rearwardly extending edges, the intermediate portions of said runner elements extending rearwardly from the front end portions thereof in downwardly spaced parallel relationship to the bottom longitudinal edges of said hood and terminating rearwardly of said hood, the rear end portions of said runner elements comprising generally semi-circular portions which have their forwardly projected upper ends secured to said hood in vertically spaced relation to a longitudinal edge thereof, and grill forming members, one each of said grill forming members having its front end secured to the front end portion of one of said runners and extending rearwardly therefrom in substantially parallel equidistantly spaced relation to an adjacent longitudinal edge of said hood and to the intermediate portion of said runner element, the rear end portion of said grill forming members being likewise generally semi-circular and concentric with the rear end portions of said runners and having their forwardly projected upper end portions secured to said hood intermediate an adjacent longitudinal edge thereof and the point of connection of the rear end portion of an adjacent runner element with said hood.

3. A plant guard for mounting on a power driven cultivator in laterally spaced relation to the soil plowing teeth thereof, said guard comprising an elongated hood having an inverted U-shaped cross section, the front end portion of said hood being formed to provide downwardly and rearwardly extending edges on opposite sides, runner elements for said hood, said runner elements being formed from metallic rod stock and having their front end portions secured one each to an opposite side of said hood and forming downward extensions of said downwardly and rearwardly extending edges, the intermediate portions of said runner elements extending rearwardly from the front end portions thereof in downwardly spaced generally parallel relationship to the bottom longitudinal edges of said hood, the rear end portions of said runner elements comprising generally semi-circular portions rearwardly of said hood which have their forwardly projected upper ends secured to said hood in vertically spaced relation to a longitudinal edge thereof, and grill forming members, one each of said grill forming members having its front end secured to the front end portion of one of said runners and extending rearwardly therefrom in substantially parallel spaced relation to an adjacent longitudinal edge of said hood and to the intermediate portion of said runner element, the rear end portion of said grill forming members being likewise generally semi-circular rearwardly of said hood and having their forwardly projected upper ends secured to said hood intermediate the adjacent longitudinally extended lower edge and the point of connection of the rear end portion of an adjacent runner element with said hood.

References Cited in the file of this patent

UNITED STATES PATENTS

| | | |
|---|---|---|
| 648,003 | Ullom | Apr. 24, 1900 |
| 1,268,117 | Harstad | June 4, 1918 |
| 2,665,994 | Gumm | Jan. 12, 1954 |